Nov. 25, 1930.  G. A. BOUVIER ET AL  1,782,402
APPARATUS FOR TESTING ELECTRICAL CONDUCTORS
Filed March 15, 1924

Inventor
George A. Bouvier
Harry L. Case
by N.A. Patterson Atty.

Patented Nov. 25, 1930

1,782,402

UNITED STATES PATENT OFFICE

GEORGE ALFRED BOUVIER, OF OAK PARK, AND HARRY LEWIS CASE, OF MAYWOOD, ILLINOIS, ASSIGNORS TO WESTERN ELECTRIC COMPANY, INCORPORATED, OF NEW YORK, N. Y., A CORPORATION OF NEW YORK

APPARATUS FOR TESTING ELECTRICAL CONDUCTORS

Application filed March 15, 1924. Serial No. 699,433.

This invention relates to apparatus for testing electrical conductors, and more particularly to an apparatus for testing traveling electrical conductors, and has as its primary object the provision of an improved method of and apparatus for testing electrical conductors of this type.

Other objects of the invention are to balance the conductivity of one section of an electrical conductor against the conductivity of another section thereof; to balance adjacent sections of a conductor; to provide improved apparatus through which a conductor may be advanced to locate imperfections in the conductor tending to vary the desired conductivity thereof, and to provide testing apparatus which will stop a traveling conductor when a fault has been located therein.

A more specific object of the invention is to stop a machine which is manufacturing an electrical conductor when the machine produces an imperfect section of conductor.

Another specific object of the invention is to provide a method of and means for testing a traveling composite electrical conductor.

The invention is disclosed in connection with a serving machine which produces a conductor having a cotton core covered by superimposed layers of tinsel. The conductor is drawn from the serving mechanism of the machine by means of a take-up spool which also draws the conductor through apparatus having contacting members adapted to engage the conductor continuously and to define equal adjacent lengths thereof. These equal adjacent lengths of the conductor form parts of an electrical circuit of the apparatus, which circuit embodies the principle of the Wheatstone bridge and is adapted to pass equal currents through the equal lengths when the lengths are of equal conductivity. The two lengths are then said to be balanced. If the lengths are not of equal conductivity an unbalanced condition results and a relay is energized which then causes other circuits of the apparatus to become closed. A solenoid in one of the latter circuits is adapted, when energized, to bring the serving machine to a full stop, the solenoid being operatively connected to a clutch in the driving mechanism of the serving machine.

Figure 1:
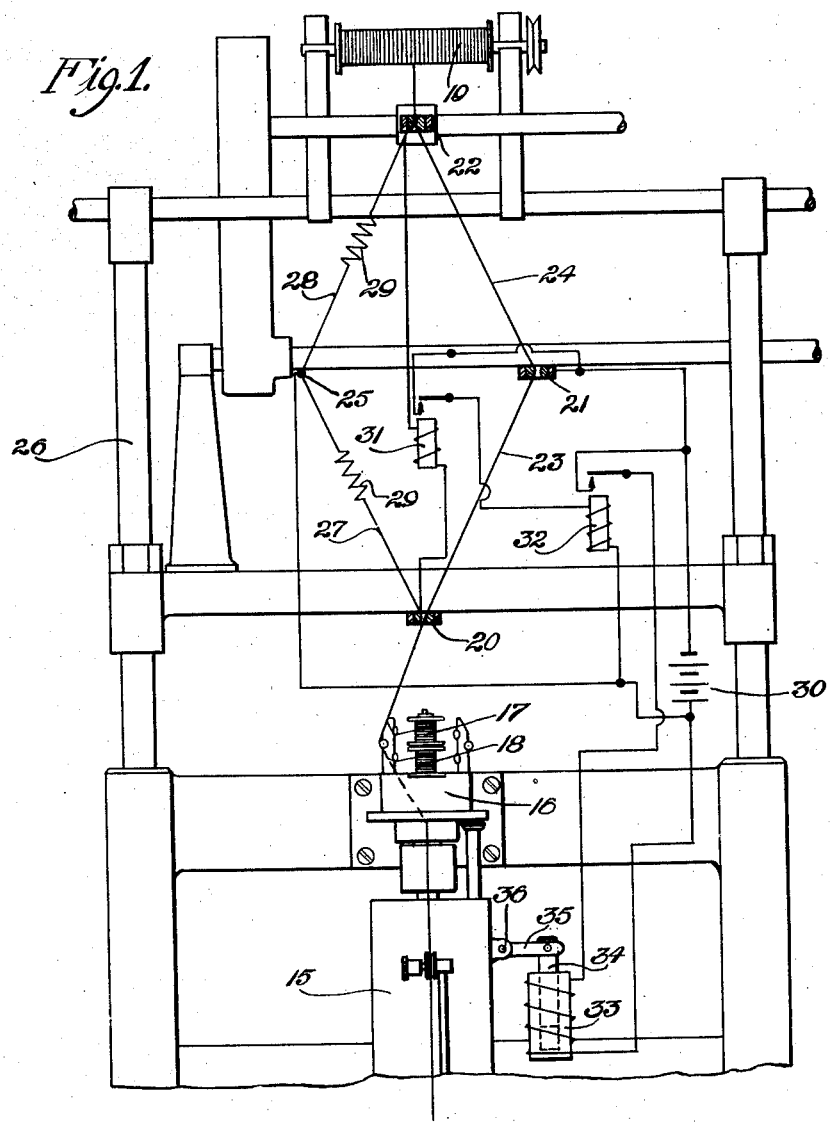
Figure 2:
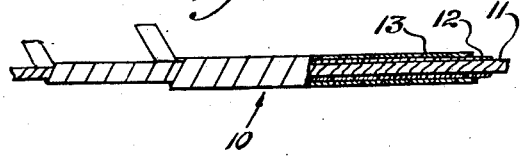

Other objects of this invention will become apparent as the detailed description progresses, reference being had to the accompanying drawing wherein, Fig. 1 is a somewhat diagrammatical view of a preferred embodiment of the invention, and Fig. 2 is a detailed view of a section of a conductor which is particularly adapted to be tested by the improved method and apparatus.

It is believed that a complete understanding of the improved method will be procured by a description of the preferred apparatus by which it may be performed.

The conductor illustrated in Fig. 2 is designated generally by the reference character 10, and comprises a cotton core 11 having superimposed layers 12 and 13 of tinsel. Conductors of this type are generally manufactured in serving machines, one of which is shown in Fig. 1. The serving machine in Fig. 1 is identified by the reference character 15, and comprises a serving head 16 carrying a plurality of cops 17 and 18 from which tinsel may be served on the core 11. The core 11 is supplied from a supply spool (not shown). A take-up spool 19 is adapted to draw the core through the serving machine, the take-up spool being driven in synchronism with the serving machine by means not shown. The serving head 16, when rotated, serves a plurality of superimposed layers of tinsel on the core 11 by means and in a manner more fully described in the co-pending application of George Alfred Bouvier, Serial No. 699,441 filed March 15, 1924. The conductor 10 travels from the serving head to the take-up spool through a plurality of contacting members 20, 21 and 22 which form parts of the improved testing apparatus and are stationary with respect to the traveling conductor. In the preferred form of our invention, the contacting members 20 and 22 are equi-distantly spaced from the contacting member 21 and therefore define equal adjacent lengths of the conductor 10. The contacting members 20 and 21 define a length which will be identified by the reference character 23, and the contacting members 21 and 22 define a length which will be identified by the reference character 24, this method of identifying the lengths being employed to facilitate the disclosure of the invention.

A binding post 25 is fixed in a frame 26 which also supports the contacting members 20, 21 and 22 and the take-up spool 19. The binding post 25 is connected to the contacting member 20 by a conductor 27, and another conductor 28 connects the binding post with the contacting member 22. Each of the conductors 27 and 28 includes a resistance unit 29. These resistance units are so designed that the total resistance of the conductor 27 is substantially equal to the total resistance of the conductor 28 to correspond to the equal values of resistance which must obtain for the sections 23 and 24 if these sections of the conductor 10 are not imperfect, it being understood that the resistance of one section of the conductor 10 should be substantially equal to the resistance of another section thereof of equal length.

The binding post 25 is connected to any suitable source of electrical energy, as for instance one terminal of a battery 30. The other terminal of the battery 30 is connected to the contacting member 21. It is apparent that the currents which pass through sections 23 and 24 will be equal in amplitude when the sections are of equal resistance and that the potential of the contacting member 20 will then be equal to the potential of the contacting member 22. Therefore, no current will flow from the contacting member 20 to the contacting member 22 through the winding of a relay 31 which is connected between the contacting members 20 and 22. However, if the conductor 10 is advanced through the several contacting members 20, 21 and 22 until an imperfect section of the conductor 10 is positioned between the contacting members 20 and 21, the potential of the contacting member 20 will differ from that of the contacting member 22 and the relay 31 will be energized to close a circuit which may be traced as follows: from the negative terminal of the battery through the contact of the relay 31, the winding of a relay 32 to the positive terminal of the battery 30. The relay 32, when energized will close a circuit which includes a solenoid 33 and may be traced as follows: from the negative terminal of the battery 30 through the contact of the relay 32, the winding of the solenoid 33 to the positive terminal of the battery. The solenoid is provided with a core 34 connected to a clutch lever 35 pivotally mounted upon the serving machine 15 by means of a pin 36. The clutch lever 35 is part of a suitable clutch (not shown) for controlling the driving mechanism of the serving machine. In practice the construction of the clutch is such that the driven and driving elements thereof will be disengaged from each other when the solenoid 33 is energized.

In the operation of the above described apparatus, the take-up spool 19 will draw the conductor 10 through the contacting members 20, 21 and 22, the conductor 10 being supplied by the serving machine 15. It is obvious that the operation of the machine, together with that of the testing apparatus, will be continuous until an imperfect section of the traveling conductor 10 appears between the contacting members 20 and 21, a section of the traveling conductor 10 being said to be "imperfect" when the resistance of the section varies from the resistance computed for a section of that length. Upon the presentation of an imperfect section between the contacting members 20 and 21, the potential of the contacting member 20 will differ from that of the contacting member 22, and the relays 31 and 32 and the solenoid 33 will become energized. The solenoid 33 will then cause the driving and driven members of the clutch to be disengaged from each other. Of course, the serving machine 15 is then brought to a full stop and the operator may remove or mark the imperfect section of conductor then defined by the contacting members 20 and 22.

If, for any reason, the apparatus should fail to detect an imperfect section of a conductor while the section lies between the contacting members 20 and 21 or if a section becomes imperfect as it is advanced to lie between the contacting members 21 and 22, the apparatus will function to detect the imperfection when the imperfection is disposed between the contacting members 21 and 22. The unbalanced condition then obtaining will result in energization of the relay 31 which then functions in the manner hereinbefore described to stop the serving machine.

When the traveling conductor 10 comprises a non-conducting core 11 having superimposed layers 12 and 13 of tinsel, it is apparent that should either of the tinsel strands break as it leaves the serving head 16 of the serving machine 15, an imperfect section will immediately appear between the contacting members 20 and 21, and it will be understood that if the innermost layer of tinsel were imperfect the operator would be unable to detect the imperfect section without the aid of testing apparatus as the imperfect section would not differ in appearance from a perfect section. Of course, if the outer strand of tinsel should break, the loose ends would fly out and apprise the operator that the section was imperfect. But in either case, the testing apparatus would immediately detect the fault and bring the serving machine to a full stop.

While the sections 23 and 24 are substantially of equal lengths and the conductor 27 is described as having a resistance equal in value to the resistance of the conductor 28, the invention is not limited to these details of construction. As set forth above, the preferred form of the invention embodies the principle of the Wheatstone bridge and it follows that the apparatus may be arranged in any preferred manner which is in accordance with the equation $$\frac{R_1}{R_2}=\frac{R_3}{R_4}$$

wherein $R_1$ is the resistance of the conductor 27, $R_2$ is the resistance of the section 23, $R_3$ is the resistance of the conductor 28, and $R_4$ is the resistance of the section 24.

What is claimed is:

In apparatus for testing electrical conductors during the process of their manufacture a plurality of relatively stationary contacting members making sliding engagement with a conductor to be tested, means associated with the contacting members for sending electrical currents of predetermined, relative values through predetermined lengths of the conductor, means for advancing the conductor through said contacting members, and means operative contemporaneously with the advancement of the conductor for indicating a failure of said first-mentioned means to send said currents of predetermined, relative values through said predetermined lengths of the conductor when the conductivity of one length varies from a value assigned with respect to the conductivity of the other length.

In witness whereof, we hereunto subscribe our names this 4th day of March, A. D. 1924.

GEORGE ALFRED BOUVIER.
HARRY LEWIS CASE.